United States Patent Office 3,537,946
Patented Nov. 3, 1970

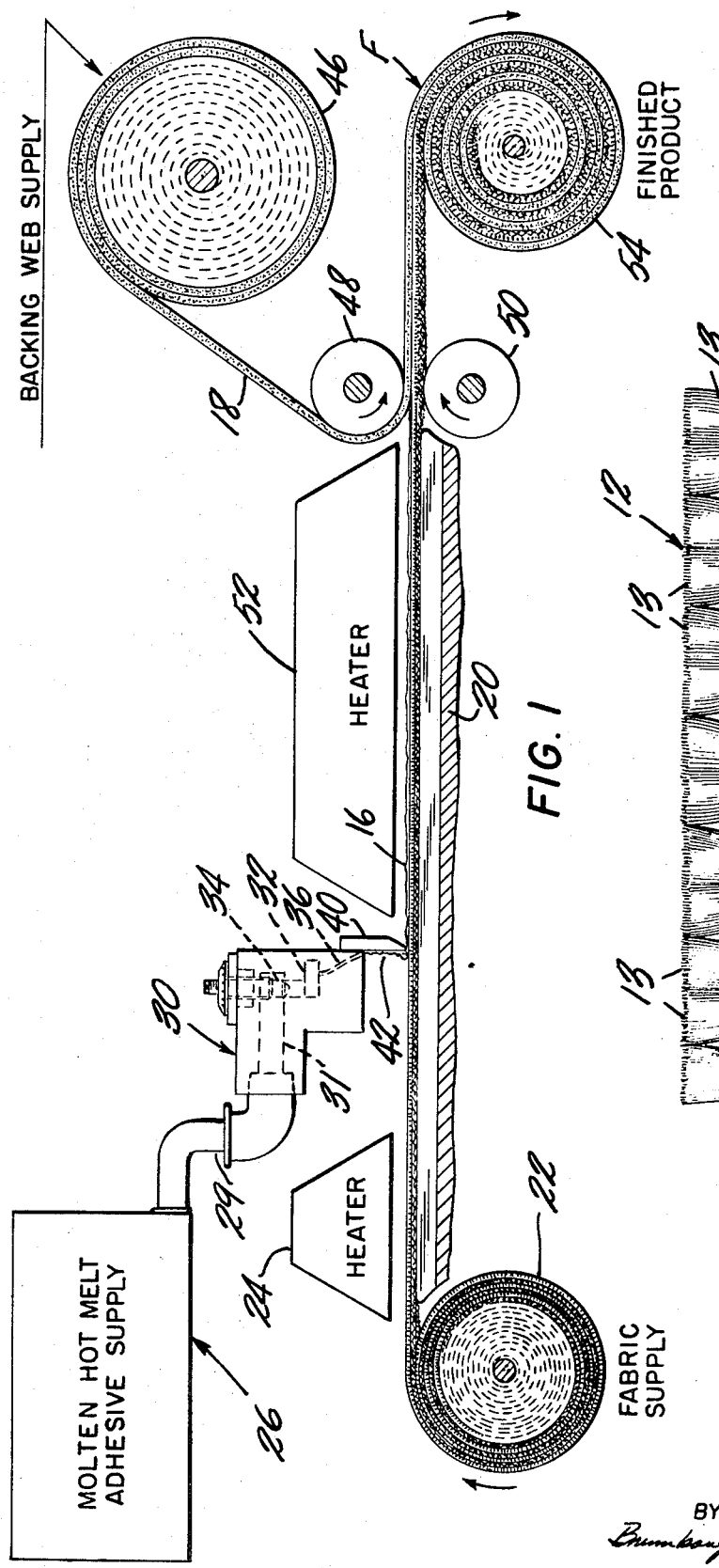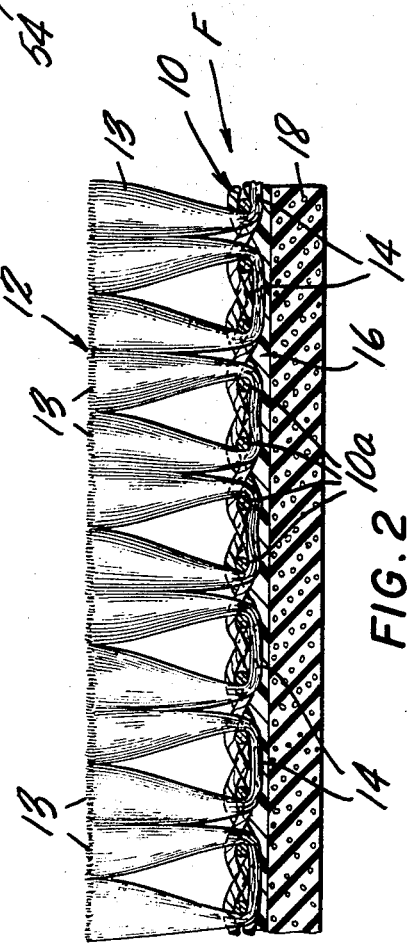

3,537,946
METHOD OF COMBINING TEXTILE MATERIALS AND PRODUCTS THEREOF
David E. Truax, Joseph C. Montagnino, and Richard H. Lewis, Charlotte, and Ben R. Sethna, Concord, N.C., assignors to Stein, Hall & Company, Inc., New York, N.Y., a corporation of New York
Filed Mar. 30, 1967, Ser. No. 627,265
Int. Cl. D05c 17/02
U.S. Cl. 161—66                    21 Claims

ABSTRACT OF THE DISCLOSURE

A method of combining textile materials with a hot melt adhesive, for such purposes as bonding fibers or yarns together or to a backing or combining two web components of a textile product, in which a uniform layer of molten hot melt adhesive is flowed onto a textile material at a predetermined rate and the adhesive layer is then smoothed and spread by a blade set to provide a minimum adhesive puddle and operating without any substantial metering or doctoring action. With heavier grades of textile materials it is preferable to preheat the material before coating it with the adhesive; post-heating of the adhesive layer can be used to maintain the adhesive in a molten condition for a period of time sufficient to permit the adhesive to penetrate the material to the desired degree. The composition of the adhesive is important, particularly the rheological properties of the composition when molten, which govern the degree of penetration and thus the effectiveness of the bonding.

BACKGROUND OF THE INVENTION

This invention relates to the manufacture of textiles and, more particularly, to a novel and improved technique for bonding or locking fibers, tufts, pile yarns, or the like to each other and/or to a base web or for combining two textile materials, such as a secondary backing of fabric, foam, sheet material or the like to a pile upholstery, drapery, or carpet.

In the manufacture of textiles of various types, there is an increasing use of adhesives to combine or assist in combining various elements or components. For example, pile fabrics of various types, such as those used for carpets, rugs, upholstery and drapery fabrics, imitation furs and the like, are often made by forming a loop structure on a base web or so-called primary backing, and then bonding or locking the loops into the backing with a suitable bonding material. In one technique known as tufting, yarns or filaments of suitable natural or synthetic materials are poked or pushed through the primary backing, which may be a fabric made from natural or synthetic yarns or a polymeric film, such that a continuous loop structure consisting of the loops that will make up the pile face of the fabric are formed on one side of the base and loops by which the pile will be united with the base web are formed on the other side. The pile is then united with the backing by a bonding material. Bonding materials are also sometimes employed in felts and knitted materials to unite the fibers or yarns. Another important use of bonding materials in textiles is in laminating two or more elements. For example, rugs, carpets, upholstery and drapery fabrics are sometimes laminated with a so-called secondary backing of fabric, foam or other sheet material.

Although a number of bonding materials have been suggested in the prior art, the bonding material predominantly used is a natural or synthetic latex composition which is deposited in fluid form on the back of the fabric and is then dried, cured or vulcanized by heating. The latex may be a foam product and serve as a resilient backing for the fabric as well as a bonding material for the fibers or tufting. Sometimes, the fabric is also provided with a secondary backing which is laid in over the latex or other bonding material and is joined to the fabric by it.

The drying, curing or vulcanizing operations required with most bonding materials used heretofore have a number of notable disadvantages. First of all, they require ovens that often measure 26 ft. by 80 to 100 ft. and thus occupy a considerable amount of floor space in a plant and require a substantial capital investment. Considerable amounts of heat are needed in the operation, the average oven temperature in such processes generally being around 275° F. The speed of a drying or curing operation is usually not more than about 1½ to 3 linear yards of fabric per minute. Large kettles and storage tanks for preparing and storing bonding materials are needed, with consequent further requirements of floor space and capital investment. The processing conditions must be carefully controlled, and the process is frequently troubled by the formation during the curing process of large bubbles, sometimes several feet across, resulting in high losses due to defective products.

SUMMARY OF THE INVENTION

There is provided, in accordance with the present invention, a novel and improved technique of bonding or locking the fibers, yarns, pile or other components of a textile material or combining two or more components of a composite textile product. The invention embodies, inter alia, the use of a hot melt adhesive composition as the locking or bonding material, and, in particular, a hot melt composition with rheological properties when molten that enables its deposition in situ on the back of the fabric. Further, the hot melt adheisve compositions have physical properties, including durability, flexibility and washability, that adapt the product for its intended uses, such as for carpeting, scatter rugs, upholstery, draperies, clothing or the like. The invention also provides a technique for applying the adhesive that has been found to yield unexpected results and has the advantages of increased speed and adaptability to relatively small, inexpensive equipment.

Hot melt adhesives are combinations of thermoplastic polyems, waxes, resins, heat stabilizers, and sometimes fillers, which are liquified by heat for application to the substrates to be bonded and which set upon cooling to form a bond. The hot melt compositions useful for the invention are characterized by a softening point in the range of from about 160° F. to about 275° F. and a viscosity (Brookfield "Synchro-Lectric" Viscometer, Model RVF) of from about 10,000 cps. to about 40,000 cps. (at 375° to 400° F.), and are formulated to have a stable viscosity over a period of time, say seven days, at working temperature. They also should have a toughness and flexibility appropriate for the particular structure and uses of the textile product, compatability with the materials of the product, and chemical resistance to substances with which the product might come into contact during use.

Preferably, the hot melt adhesive compositions contain a mixture of from about 40% to about 60%, preferably 40% to 45%, of a thermoplastic polymer, from about 40% to about 60%, preferably 55% to 60%, of a thermoplastic tachifying resin and a small amount of heat stabilizers, such as BHT (butyl hydroxylated toluene). An inert filler may be included in the adhesive in an amount of up to about one part filler to three parts of the polymer/resin mixture, by weight. Further, a portion of the resin may be replaced by a wax, though better results are usually obtained with adhesives that do not contain a wax.

It has been found, in accordance with the invention, that the technique of applying the adhesive to the fabric is of considerable importance to obtaining optimum tuft lock, inter-fiber lock and bond between a secondary backing, where provided, and the fabric. Thus, although other methods can be employed with a degree of success, it has been found that unexpected results, particularly with respect to the uniformity of the hot melt coating, the resistance to delamination, the strength and durability of tuft lock, and other properties, are obtained with the preferred mode of adhesive deposition.

In particular, the preferred process involves moving the fabric at a predetermined speed and depositing a layer of molten hot melt adhesive uniformly across the fabric at a predetermined rate by flowing it on from a suitable manifold-type applicator. Deposition of the adhesive layer is accomplished without calendering or doctoring the adhesive to obtain thickness control; on the other hand, the layer, promptly upon deposition on the fabric, is spread and smoothed with a heated blade set to preclude or minimize any doctoring or metering action.

Where the adhesive is used to unite or bond fibers or yarns, the rheological properties of the adhesive composition will be such that it penetrates into the spaces between the fibers or the interstices between the yarn fibers, to provide yarn and fiber encapsulation, thus affording desired inter-fiber lock, and the materials are preferably transported along a horizontal plane while the adhesive is deposited on top to enhance the penetration by gravity forces. For example, the bonding of tufted carpeting is best carried out in this way to obtain high tuft lock and inter-fiber bond. On the other hand, the properties of the molten adhesive will also generally be such that it does not strike through the material so that the face is kept substantially free of adhesive material.

It has been found that some materials, notably carpet and heavier grades of rugs, that preheating the back of the goods prior to deposition of the adhesive affords improved bond by increasing the time that the adhesive remains fluid to permit it to penetrate or permeate the inter-yarn and inter-fiber spaces to the desired degree.

Where the method of the invention is employed to combine two or more components of a textile product, for example, a secondary backing web to a carpet or rug, the backing is laid in on the smoothed adhesive layer while at least the surface of the adhesive layer is unsufficiently tacky to permit the backing web to strike in or to be calendered under pressure onto the surface of the adhesive so as to at least partially embed elements of the backing material into the adhesive. Alternatively, adhesive can be coated onto the secondary backing and the backing promptly laid in on the carpet or rug.

In some instances, the adhesive layer should be exposed to heat after deposition to keep the adhesive in a flowable state for sufficient time to penetrate the fiber or yarn structure to the desired degree.

The invention may be employed with various textile materials, such as carpets and rugs, upholstery and drapery fabrics, imitation furs, clothing goods and the like. The fabrics can be woven, knitted, tufted or non-woven. Moreover, two or more components of various materials, such as fabrics of natural or synthetic fibers, natural or synthetic rubber sheet or foam, polyurethane and other polymeric foams, polypropylene woven and non-woven backings, polymeric films and the like can be combined using hot melt adhesive according to the method of the invention. As will readily be apparent to those skilled in the art, the specific process conditions and the adhesive compositions used will vary somewhat according to the nature of the product.

The invention provides a number of notable advantages over heretofore known techniques and products. Most importantly, the slow, costly curing step required in latex and plastisol processes is eliminated, inasmuch as the product is completed upon cooling and setting of the adhesive. The savings in plant space, capital investment in curing ovens and latex mixing and storing equipment, and in greatly increased speed combine to provide improved efficiency and lower cost. Textile products embodying the invention are characterized by excellent yarn lock, inter-fiber lock, backing web bond, resistance to pilling, washfastness, where applicable, and other desirable properties.

BRIEF DESCRIPTION OF THE DRAWING

For a better understanding of the invention, reference may be made to the following description of exemplary embodiments, taken in conjunction with the figures of the accompanying drawing, in which:

FIG. 1 is a schematic elevational view showing apparatus for carrying out the method of the invention and constitutes a diagram of the method; and FIG. 2 is a view in section of a typical tufted pile fabric made according to the invention.

DESCRIPTION OF EXEMPLARY EMBODIMENTS

The drawings show an embodiment of the method of the invention and a product thereof as applied to the manufacture of tufted fabrics, such as carpets, rugs, upholstery and drapery fabrics and the like. In accordance with well known manufacturing methods, a primary backing web of natural or synthetic yarns or filaments, polymeric films or the like receives a pile structure produced by pushing a tufting yarn of a suitable natural or synthetic material through the primary backing to create a formation of loops on the top face of the backing which will form the pile and to create projecting loop portions on the back face of the backing which serve to retain or lock the tufting in position upon application of a bonding material. After the pile structure is locked or bonded in place on the base material, the tuft loops may, if desired, be cut or sheared. Various patterns and depths of tufting are of course possible.

FIG. 2 shows an exemplary tufted pile fabric F of the type used for rugs and carpets which is composed of a primary backing web 10 in the form of a woven fabric, and a tufted pile structure 12 of suitable yarns 13 pushed into the web 10 and later sheared to provide a sheared pile. Since the loops are usually pushed through from the underside of the backing, loop portions 14 joining adjacent tufts of the pile ordinarily pass under one or more of the filling or warp elements 10a of the backing 10.

Referring to FIG. 1, the process, as depicted by the schematic illustration of apparatus that can be used for it, is carried out continuously by moving the tufted fabric along a suitable, preferably substantially horizontal supporting surface 20 with its underside facing up, the fabric being supplied from a roll 22, for example. As a first step in the operation, but one which is not always required, the fabric may be preheated by passing it below a suitable heater 24, such as a gas-fired radiant heating unit. The backing is heated to reduce its tendency to draw heat from the adhesive upon its application to the fabric and thereby enable the adhesive to remain fluid for a period of time sufficient to permit the penetration of the adhesive into the pile structure more completely to encapsulate the fibers and provide the desired tuft lock and inter-fiber or so-called bundle lock. Generally speaking, preheating the back face of the fabric, or postheating the adhesive coating after it is deposited on the fabric, as described below, or both preheating and postheating should be resorted to whenever it is found that the adhesive has not sufficiently penetrated, for example, into the tuft structure loops 14 and the back face of the primary backing 10 to provide a good tuft lock and bundle lock. The degree of preheating, postheating or both will vary according to the particular textile material and the composition of the adhesive. Usually, any relatively heavy textile materials such as carpets or rugs, will be preheated to obtain the desired penetration of adhesive.

The hot melt adhesive is initially in the form of solid blocks or granules and must be melted down and supplied for the process by an adhesive supply 26 which may be of the extruder type or may be composed of a melting reservoir and a variable delivery pump. The molten adhesive is delivered under suitable pressure from the supply 26 through a conduit 29 to a manifold type of applicator 30, which is appropriately heated to maintain the temperature of the adhesive at the desired value, as described hereinafter. The applicator 30 extends across the width of the fabric and includes a primary supply channel 31 extending along its entire length and a series of shorter secondary chambers 32 distributed along its length and supplied from the main channel 31 through adjustable distribution needle valves 34, one of which is associated with each of the chambers 32. The multiple chambers 32, upon appropriate adjustment of the valve 34, insure even distribution of the adhesive across the width of the web. The adhesive is discharged from the several chambers 32 through a series of closely spaced orifices 36 located say about every one-half inch along the length of the unit.

Extending along the length of the applicator 30 is a smoothing blade 40, and the adhesive upon leaving the orifices 36 flows downwardly in a series of closely spaced streams along the back of the blade and from the blade onto the back of the tufted fabric.

It has been found to be of particular importance to maintain a closely controlled rate of deposition of the adhesive onto the fabric and to set the smoothing blade 40 so that there is a minimum adhesive puddle behind the blade; thus, the applicator 30 is mounted for vertical adjustment so that the blade 40 can be set quite precisely to a position where it provides only a spreading and smoothing action and its tendency to meter or control the thickness of the adhesive coating deposited onto the back of the fabric is minimized. The uniformity of the coating is provided by the applicator, especially the distribution chambers 32. The rate of delivery of the adhesive is governed by the supply pressure and of course can be varied to meet the requirements of the particular product being made.

Upon deposition onto the back of the fabric, the molten hot metal adhesive penetrates the yarn structure loops 14 on the back surface of the backing 10 to an extent that it provides, upon solidification of the adhesive, at least about 80%, and 100% under some conditions, encapsulation of the yarns and the fibers of the yarns to firmly lock them in place on the fabric. With lighter gauge tufted fabrics such as drapery and upholstery materials and scatter rugs, the adhesive will penetrate into the pile structure relatively quickly after deposition from the applicator, and with such fabrics, it is appropriate to lay in a secondary backing material, if desired, immediately after deposition of the adhesive. The secondary backing 18 is delivered from a supply roll 46 and is laid in under a pressure roll 48 which forms a nip with a back up roll 50, the rolls 48 and 50 being set to provide a predetermined pressure effective to press the secondary backing into the adhesive coating sufficiently to embed its surface portions in the adhesive layer and thus provide a good mechanical bond between it and the tufted fabric.

Although the secondary backing 18 may, as mentioned above, be laid in almost immediately after adhesive deposition where lighter grade fabrics are being processed, heavier fabrics will often require a somewhat longer time for penetration of the adhesive into the pile structure. In these cases it may be appropriate, and sometimes necessary, to expose the newly deposited molten adhesive layer to post-heating to prevent it from setting or solidifying before the degree of penetration required to provide a good lock between the tufting and backing has occurred. In this case, one or more post-heating units 52 are provided downstream from the applicator 30 to heat the adhesive layer and increase the time during which it remains fluid after deposition. A combination of preheating and postheating is effective to maintain appropriate adhesive flow characteristics for a sufficient time to enable penetration of the adhesive into relatively heavier pile structure and the lamination of the backing to the fabric.

Where post-heating is employed, the backing web 18 is laid in after the desired post-heating has been completed. It should be mentioned that the nip pressure between the rolls 48 and 50 will not only press the secondary backing 18 into the adhesive layer but will also squeeze the adhesive further into the tuft structure on the back of the fabric and into the primary backing 10.

It will sometimes be advisable, particularly with relatively open mesh secondary backing fabrics, to chill the pressure roll 48 to maintain a roll surface temperature of say 40° F. to provide more rapid solidification of the adhesive layer upon lay-in of the secondary backing and thereby to prevent the adhesive from striking through the backing fabric.

It is, therefore, apparent from the foregoing that preheating or post-heating or both may be omitted or provided as dictated by the materials. Where there is no post-heating the rolls 48 and 50 will be located just a few inches downstream from the applicator to provide backing web lay-in before the adhesive sets.

After leaving the nip between the backing lay-in rolls 48 and 50, the then bonded and backed tufted fabric product can be passed through suitable cooling apparatus (not shown), such as a series of chill rolls or an air cooling chamber, to cool the adhesive layer sufficiently to permit the completed fabric to be wound onto a take-up roll 54, as shown, or plaited off.

As mentioned previously, the method of the invention can be used to considerable advantage in combining two or more components of a textile product. For example, a conventional latex-bonded tufted carpet or rug can be combined with a secondary backing by applying a hot melt adhesive over the latex coat of the tufted carpet and then laying in the secondary backing. Alternatively, the hot melt can be coated onto the secondary backing and the backing and carpet combined before the adhesive sets. In either case, post-heating of the adhesive coating may or may not be employed, depending upon the materials and the adhesive composition.

It will be apparent that the properties of the hot melt adhesive composition, both in the molten state for processing and in the solid state in the final product, are of considerable importance in providing satisfactory fiber, yarn and bundle lock and/or adhesion in a product, and the invention embodies hot melt adhesive compositions that have been found to provide good results. More particularly, the hot melt adhesive compositions include, by weight, from about 40% to about 60%, and preferably 40 to 45%, thermoplastic polymers selected from the group consisting of polyolefinic polymers, ethylene/vinyl acetate copolymers, ethylene/isobutylacrylate copolymers, ethylene/ethylacrylate copolymers and combinations thereof and from about 40% to about 60%, and preferably 55% to 60% thermoplastic tackifying resins selected from the group consisting of terpene, rosin and modified rosin, polyisobutylene and combinations thereof. They also include a small amount, say about 0.5%, of heat stabilizer, such as BHT (butyl hydroxylated toluene). A portion of the tackifying resin can be replaced by a microcrystalline or synthetic wax. Also, an inert filler, such as No. 10 whiting, precipitated $CaCO_3$, clay, talc, and the like, may be combined with the adhesive in an amount of up to about one part filler to three parts adhesive by weight.

The following examples are indicative of the textile materials and specific hot melt adhesive compositions appropriate for the invention.

EXAMPLE I

A commercial grade woven cotton and nylon carpet was bonded to provide yarn lock and combined with a high density rubber latex foam secondary backing using the hot melt adhesive composition set forth below and apparatus conforming substantially to that shown in FIG. 1.

Compound: Percent by weight
- Copolymer of ethylene/isobutylacrylate (70/30 co-monomer ratio, with a density of 0.925, melt index of 2 to 3 and Vicat softening point of 100° F.) ("Zetafax" 1370—Dow Chemical Co.) _____ 30
- Copolymer of ethylene/vinyl acetate (72/28 co-monomer ratio, with a density of 0.95, melt index of 350) ("DQDA" 7268 (EVA501)—Union Carbide)) _____ 10
- Pentaerythritol ester of hydrogenated rosin with a softening point of 104° C. ("Pentalyn" H—Hercules Powder Co.) _____ 59.5
- Catalin CaO-3 (heat stabilizer) _____ 0.5
  - Brookfield viscosity (375° F.)—36,100 cps.
  - Softening point—216° F.
  - Tack range—15° F.
  - Solids content—100%

The carpet, conveyed back face up, was first preheated, and then the above adhesive composition, maintained at a temperature of 375° F. in the applicator 30, was delivered by appropriate adjustment of the pump 28 at a rate of 12 oz. per square yard. The smoothing blade 40 was set to provide as little metering and puddling of the adhesive behind the blade as possible but sufficient to just smooth and spread the adhesive. The adhesive layer was post-heated and the foam web was then laid in under pressure between the rolls 48 and 50.

Tests conducted on the carpet-foam laminate showed an average yarn lock over 15 lbs., excellent foam adhesion, and close to 100% yarn encapsulation.

EXAMPLE II

Carpets were made in accordance with the procedure set forth in Example I using the same carpet, foam backing, and adhesive composition. However, the rate of adhesive deposition was reduced to 10 oz. per square yard from the 12 oz. in Example I. It was found that the average tuft lock was only slightly reduced, but was still very nearly 15 lbs. The foam backing bond remained good, and the fiber encapsulation was about 80%, which was judged to be acceptable in the industry for the type of carpet.

EXAMPLE III

A knitted, high pile fabric suitable for use as scatter rugs and composed of a primary backing and pile was tuft-bonded and laminated to a polyurethane foam secondary backing employing the following hot melt adhesive composition:

Compound: Percent by weight
- Copolymer of 80% ethylene/20% ethyl acrylate with melt index of 18 ("EA" 2018—Dow chemcal) _____ 25
- High density polyethylene with density of 0.947 and melting point of 126° C. ("Epolene" C-11—Eastman) _____ 20
- Polyisobutylene ("Vistanex" LMMH—Enjay) __ 10
- Thermoplastic terpene resin ("Piccolyte" S-100—Penn. Indust. Chem.) _____ 45
  - Brookfield viscosity (375° F.)—9600 cps.
  - Softening point—247° F.
  - Tack range—7° F.
  - Solids content—100%

The above composition was deposited from the applicator at 375° F. on the tufted fabric in an amount of between 4 and 5 oz. per square yard in accordance with the process and apparatus shown in FIG. 1 and described above, except that there was neither preheating nor post-heating of the material. The adhesive layer was smoothed by the blade, and the foam backing web was then laid in approximately three inches downstream from the smoothing blade 40. Tests on these products showed adequate tuft and bundle lock and good bond between the fabric and the foam backing. However, they were judged to have inferior wash fastness when subjected to machine washing tests.

Additional samples were prepared as above except that the amount of adhesive was increased to 6 oz. per square yard. The tuft and inter-fiber lock was found to be similar to the samples having 4 to 5 oz. per square yarn adhesive, but in addition, they had superior wash fastness as exemplified by no tendency for delamination or other failure after 25 machine washings.

EXAMPLE IV

Commercial woven carpet of cotton and nylon having a tuft-bond of latex was combined with 3/16 inch butadiene-styrene foam secondary backing using the hollowing adhesive composition:

Compound: Percent by weight
- Copolymer of 70% ethylene/30% isobutyl-acrylate, density 0.925 and melt index of 2–3 ("Zetafax" 1370—Dow Chemical) _____ 30.0
- Copolymer of 72% ethylene/28% vinyl acetate, density of 0.951 and melt index of 350 ("EVA" 501—Union Carbide) _____ 10.0
- Terpene tackifying resin (density 0.93 and softening point of 95° C. ±5) ("Wing Tack" 95, Goodyear Chemical) _____ 59.5
- Catalin CaO-3 (heat stabilizer) _____ 0.5
  - Brookfield viscosity—16,500 cps.
  - Softening point—199° F.
  - Tack range—14° F.
  - Solids content—100%.

Samples were prepared by preheating the back of the carpet and coating between 4 and 5 oz. per square yard adhesive onto it at 375° F. using the blade coating apparatus of FIG. 1 in the manner described. The adhesive layer was post-heated and the foam backing laid in under pressure between the rolls. Excellent carpet-to-foam bond was obtained.

Additional samples of the same product were made by coating the foam backing, without preheating, with 4 to 5 oz. per square yard, post-heating the adhesive layer and laying in the carpet. No significant differences in the resulting product were detected.

Various textile materials were tuft-bonded and/or laminated with the following adhesive compositions employing the method of the invention as described above. In general, straight combining was accomplished with 4 to 5 oz. adhesive per square yard, while tuft-bonding or locking was carried out at from 10 to 16 oz. per square yarn. All samples produced were judged to be acceptable under industry standards.

EXAMPLE V

Compound: Percent by weight
- Coplymer of ethylene/vinyl acetate (72/28 co-monomer ratio, density 0.954 and melt index of 6.) ("Elvax" 260—Du Pont) _____ 22.5
- Copolymer of ethylene/vinyl acetate (72/28 co-monomer ratio, density 0.951, and melt index of 340–470) ("Elvax" 210—Du Pont) ____ 7.5
- Terpene tackifying resin (density 0.93 and softening ponit 95° C. ±5) ("Wing Tack" 95—Goodyear Chemical) _____ 44.5
- Zirconium silicates filler (0.5 micron particle size) ("Ultrox" 1000W—Metal & Thermit

EXAMPLE V—Contd.

| Compound: | Percent by weight |
|---|---|
| Corp.) | 25.0 |
| BHT as heat stabilizer | 0.5 |

Brookfield viscosity—15,000 cps.
Softening point—212° F.
Tack range—37° F.
Solids content—100%.

EXAMPLE VI

| Compound: | Percent by weight |
|---|---|
| Copolymer of ethylene/ethyl acrylate (80/20 co-monomer ratio, dentity 0.929 and melt index of 18±2) ("Zetafax" 1075—Dow Chemical) | 30.0 |
| Terpene tackifying resin (density 0.93 and softening point 95° C.±5) ("Wing Tack" 95—Goodyear Chemical) | 44.6 |
| Precipitated CaCO$_3$ filler ("Multifex" MM—Diamond Alkali) | 25.0 |
| BHT as heat stabilizer | 0.4 |

Brookfield viscosity—10,300 cps.
Softening point—240° F.
Tack range—10° F.
Solids content—100%

EXAMPLE VII

| Compound: | Percent by weight |
|---|---|
| Copolymer of ethylene/vinyl acetate (72/28 co-monomer ratio, density 0.954 and melt index of 6.0) ("Elvax" 260—DuPont) | 22.5 |
| Copolymer of ethylene/vinyl acetate (72/28 co-monomer ratio, density 0.951 and melt index of 340–470) ("Elvax" 210—DuPont) | 7.5 |
| Pentaerythritol ester of hydrogenated rosin (density of 1.07 and softening point of 104° C.) ("Pentalyn" H—Hercules Powder) | 44.5 |
| Zirconium silicates filler (0.5 micron particle size) ("Ultrox" 100W—Metal & Thermit Corp.) | 25.0 |
| BHT as heat stabilizer | 0.5 |

Brookfield viscosity—36,000 cps.
Softening point—200° F.
Tack range—33° F.
Solids content—100%

EXAMPLE VIII

| Compound | Percent by weight |
|---|---|
| Polyethylene (density 0.915, melt index of 50) ("Tenite" 15 DOA—Eastman Chemical) | 40.0 |
| Ethylene/vinyl acetate (72/28 co-monomer ratio, density 0.951, and melt index of 350) ("EVA 501—Union Carbide) | 10.0 |
| Terpene tackifying resin (density 0.93, softening point 95° C.±5°) ("Wing Tack" 95—Goodyear Chemical) | 49.5 |
| BHT as heat stabilizer | 0.5 |

Brookfield viscosity—10,000 cps.
Softening point—220° F.
Tack range—3° F.
Solids content—100%

EXAMPLE IX

| Compound: | Percent by weight |
|---|---|
| Polyethylene (density 0.915, melt index of 50) ("Tenite" 15 DOA—Eastman Chemical) | 50.0 |
| Ethylene/vinyl acetate (72/28 co-monomer ratio, density 0.951, and melt index of 350) ("EVA" 501—Union Carbide) | 10.0 |
| Terpene tackifying resin (density 0.93, softening point 95° C.±5°) ("Wing Tack" 95—Goodyear Chemical) | 39.5 |
| BHT as heat stabilizer | 0.5 |

Brookfield viscosity—21,600 cps.
Softening point—221° F.
Tack range—3° F.
Solids content—100%

EXAMPLE X

The adhesive composition described in Example I was used to tuft-lock a commercial grade tufted nylon carpet and to combine with the carpet a rubber secondary backing sheet, the rubber backing having an embossed pattern defining a series of ribs on its exposed side and a roughened surface on the adhered side. The adhesive was deposited on the carpet, without preheating the carpet, in amounts, in exemplary samples, of 7.0 oz. per square yard and 12.4 oz. per square yard at a rate of 4 linear yards per minute. The adhesive layer was post-heated to afford desired penetration into the tufting, and the rubber sheet backing was then laid in. With the 7.0 oz. coating, the average tuft lock was determined to be 18.3 lbs. and the fiber encapsulation or penetration in the range of 80% to 90%. With the 12.4 oz. coating, 100% encapsulation and over 20 lbs. average tuft lock were obtained. In both cases the rubber backing material ruptured without any evidence of delamination having been observed, thus indicating that the adhesive bond was stronger than the rubber sheet.

The foregoing embodiments and specific examples of the invention described above are intended to be merely exemplary, and those skilled in the art will be able to make many variations and modifications of them without departing from the spirit and scope of the invention. All such modifications and variations are intended to be within the scope of the invention as defined in the appended claims.

We claim:

1. In a method of making pile fabrics, the steps of moving a web component of the fabric along a predetermined generally horizontal path, depositing at a controlled rate of deposition from a heated manifold type distributing apparatus located in close proximity to the upwardly facing surface of the web a layer of molten hot melt adhesive on the upwardly facing surface of the moving web, the molten adhesive having a viscosity of between about 10,000 cps. and about 40,000 cps. and a softening point of between about 160° F. and about 275° F. and the layer being evenly distributed across the width of the web, and immediately upon deposition of the adhesive layer smoothing the adhesive layer with a blade set to provide a minimum adhesive puddle and operating without any substantial metering or doctoring action.

2. A method according to claim 1 wherein the molten adhesive is deposited on the web by flowing it on from a heated distributing head in a multiplicity of closely spaced streams.

3. A method according to claim 1 wherein the molten adhesive layer is smoothed before any substantial cooling occurs.

4. A method according to claim 3 wherein the adhesive is deposited by flowing it downwardly across the upstream face of the smoothing blade.

5. A method according to claim 1 further comprising the step of laying in a second web over the smoothed adhesive layer before the layer sets.

6. A method according to claim 5 further comprising the step of pressing the second web into the adhesive layer to at least partially embed elements thereof in the adhesive.

7. A method according to claim 6 wherein the pressing force is effective to further strike the adhesive into the first web.

8. A method according to claim 5 further comprising the step of exposing the adhesive layer to heat between the smoothing step and the laying in of the second web to increase the time that the molten adhesive remains fluid to afford further penetration of the adhesive into the first web.

9. A method according to claim 1 further comprising the step of exposing the first web to heat prior to depositing the adhesive layer thereon so as to lessen the effect of heat transfer from the molten adhesive to the first web and thus increase the time that the molten adhesive remains fluid to afford further penetration of the adhesive into the first web.

10. A method according to claim 1 wherein the hot melt adhesive includes a mixture of by weight from about 40% to about 60% of a thermoplastic polymer selected from the group consisting of polyolefins, copolymers of ethylene and isobutylacrylate, vinyl acetate and ethyl acrylate and combinations thereof, and from about 40% to about 60% of a tackifying resin selected from the group consisting of rosin, modified rosins, polyisobutylene, terpene, and mixtures thereof.

11. A method according to claim 10 wherein the mixture includes from about 40% to about 45% of the thermoplastic polymer and from about 55% to about 50% of the resin.

12. A method according to claim 10 wherein the adhesive further includes an inert filler in an amount not substantially in excess of about one part filler to three parts of the said mixture.

13. In a method of making tufted fabrics, the steps of moving the fabric back surface up along a substantially horizontal path, flowing a molten hot melt adhesive onto the back of the fabric in a multiplicity of closely spaced streams from a heated manifold-type distributing head and at a controlled rate, the adhesive including a mixture of by weight from about 40% to about 60% of a thermoplastic polymer selected from the group consisting of polyolefins, copolymers of ethylene and isobutylacrylate, vinyl acetate and ethyl acrylate, and mixtures thereof and from about 40% to about 60% of a tackifying resin selected from the group consisting of rosin, modified rosins, polyisobutylene, terpene, and mixtures thereof, the molten adhesive having a viscosity of from about 10,000 to 40,000 cps. and a softening point of between about 160° F. and about 275° F., and immediately upon deposition of the ad hesive layer smoothing the adhesive with a blade set to provide a minimum adhesive puddle and operating without any substantial metering or doctoring action.

14. A method according to claim 13 further comprising the step of laying in a second web on the smoothed adhesive layer before the layer sets, the second web being laid in under a pressure effective to at least partially embed elements thereof in the adhesive layer.

15. A method of laminating a backing web onto a pile fabric web to form a composite textile product comprising the steps of moving a first web along a predetermined generally horizontal path, flowing a molten hot melt adhesive onto the upwardly facing surface of the web in a multiplicity of closely spaced streams from a heated manifold-type distributing head at a controlled rate, the adhesive including a mixture of by weight from about 40% to about 60% of a thermoplastic polymer selected from the group consisting of polyolefins, copolymers of ethylene and isobutylacrylate, vinyl acetate and ethyl acrylate, and mixtures thereof and from about 40% to about 60% of a tackifying resin selected from the group consisting of rosin, modified rosins, polyisobutylene, terpene, and mixtures thereof, the molten adhesive having a viscosity of from about 10,000 to 40,000 cps. and a softening point of between about 160° F. and about 275° F., and immediately upon deposition of the adhesive layer smoothing the adhesive with a blade set to provide a minimum adhesive puddle and operating without any substantial metering or doctoring action and laying in a second web on the smoothed adhesive layer before the layer sets under a pressure effective to at least partially embed elements thereof in the adhesive layer.

16. A tufted fabric comprising a primary backing web, a pile structure formed on the backing web and including tuft loops protruding through the backing web, and a coating of hot melt adhesive locking the tufting to the backing web, the hot melt adhesive composition including a mixture of by weight from about 40% to about 60% of a thermoplastic polymer selected from the group consisting of polyolefins, copolymers of ethylene and isobutylacrylate, vinyl acetate and ethyl acrylate and mixtures thereof, and from about 40% to about 60% of a tackifying resin selected from the group consisting of rosin, modified rosins, polyisobutylene, terpene, and mixtures thereof, the adhesive composition being deposited from a heated manifold-type distributing head in molten state on the back of the tufted fabric at a controlled rate and at a viscosity of between about 10,000 cps. and about 40,000 cps. and being spread and smoothed thereon immediately upon deposition of the adhesive layer with a blade set to provide a minimum adhesive puddle and operating without any substantial metering or doctoring action.

17. A pile fabric textile product comprising first and second web components and a bonding layer joining the two components together, the bonding layer being a hot melt adhesive composition containing a mixture of by weight from about 40% to about 60% of a thermoplastic polymer selected from the group consisting of polyolefins, copolymers of ethylene and isobutylacrylate, vinyl acetate and ethyl acrylate and mixtures thereof, and from about 40% to about 60% of a tackifying resin selected from the group consisting of rosin, modified rosins, polyisobutylene, terpene, and mixtures thereof, the adhesive composition being deposited from a heated manifold-type distributing head in a molten state on one of the web components at a controlled rate with a viscosity of between about 10,000 cps. and about 40,000 cps. and being spread and smoothed immediately upon deposition of the adhesive layer with a blade set to provide a minimum adhesive puddle and operating without any substantial metering or doctoring action, and the other web component being combined under pressure with the adhesive-coated component before the adhesive composition sets.

18. A textile product according to claim 17 wherein one of the components is a tufted fabric and the other component is a secondary backing for the fabric.

19. A textile product according to claim 18 wherein the secondary backing is a fabric.

20. A textile product according to claim 18 wherein the secondary backing is an elastomeric sheet material.

21. A textile product comprising a tufted fabric including a primary backing web and a pile structure formed on the backing web and having tufted loop portions protruding therethrough, a secondary backing web on the undersurface of the tufted fabric, and a layer of a hot melt adhesive composition between the fabric and the backing and locking the pile structure loop portions to the primary backing web and bonding the secondary backing web to the tufted fabric, the hot melt adhesive composition comprising a mixture of by weight from about 40% to about 60% of a thermoplastic polymer selected from the group consisting of polyolefins, copolymers of ethylene and isobutylacrylate, vinyl acetate and ethyl acrylate and mixtures thereof, and from about 40% to about 60% of a tackifying resin selected from the group consisting of rosin, modified rosins, polyisobutylene, terpene, and mixtures thereof, and the adhesive composition being deposited from a heated manifold-type distributing head in a molten state on one of the web components of the product at a controlled rate and at a viscosity of between about 10,000 cps. and about 40,000 cps. and being spread and smoothed thereon immediately upon deposition of the adhesive layer with a blade set to provide a minimum adhesive puddle and operating without any substantial metering or doctoring action, and the other web component being combined under pressure with the adhesive-coated component before the adhesive composition sets.

(References on following page)

References Cited

UNITED STATES PATENTS

| | | |
|---|---|---|
| 2,120,801 | 6/1938 | Drobile. |
| 2,271,458 | 1/1942 | Lionne _____ 117—111 |
| 2,981,638 | 4/1961 | Jones _____ 117—111 |
| 2,159,151 | 5/1939 | Hershberger _____ 117—64 |
| 2,251,295 | 8/1941 | Sheesley _____ 117—111 |
| 3,036,942 | 5/1962 | Squier _____ 161—66 XR |
| 3,070,066 | 12/1962 | Faeber _____ 118—261 XR |
| 3,390,035 | 6/1968 | Sands _____ 156—72 |

ROBERT F. BURNETT, Primary Examiner

R. H. CRISS, Assistant Examiner

U.S. Cl. X.R.

117—64, 111; 156—72; 161—67